(12) United States Patent
Margolis

(10) Patent No.: US 7,245,711 B2
(45) Date of Patent: Jul. 17, 2007

(54) VIRTUAL INTERACTION QUEUING USING INTERNET PROTOCOLS

(75) Inventor: Michael Margolis, London (GB)

(73) Assignee: Avaya Technology Corp., Basking Ridge, NJ (US)

( * ) Notice: Subject to any disclaimer, the term of this patent is extended or adjusted under 35 U.S.C. 154(b) by 622 days.

(21) Appl. No.: 10/177,120

(22) Filed: Jun. 24, 2002

(65) Prior Publication Data

US 2003/0235287 A1 Dec. 25, 2003

(51) Int. Cl.
*H04M 3/42* (2006.01)
(52) U.S. Cl. .......................... 379/209.01; 379/265.01; 379/265.09; 379/265.1; 379/265.11; 379/266.01; 379/309
(58) Field of Classification Search ........... 379/209.01, 379/265.01, 265.09, 265.1, 265.11, 266.01, 379/309
See application file for complete search history.

(56) References Cited

U.S. PATENT DOCUMENTS

| | | | |
|---|---|---|---|
| 5,185,782 A | 2/1993 | Srinivasan | 379/210.01 |
| 5,884,032 A * | 3/1999 | Bateman et al. | 709/204 |
| 5,915,011 A * | 6/1999 | Miloslavsky | 379/219 |
| 6,002,760 A * | 12/1999 | Gisby | 379/266.01 |
| 6,259,786 B1 | 7/2001 | Gisby | 379/266.01 |
| 6,332,154 B2 | 12/2001 | Beck et al. | |
| 2001/0012335 A1* | 8/2001 | Kaufman et al. | |
| 2002/0056000 A1 | 5/2002 | Coussement | 709/725 |
| 2003/0206619 A1* | 11/2003 | Curbow et al. | |

FOREIGN PATENT DOCUMENTS

EP 1 087 596 A2 9/2000
WO WO 00/44159 7/2000

* cited by examiner

*Primary Examiner*—Quynh H. Nguyen

(57) ABSTRACT

A method and system for processing a call when a call recipient is unavailable by using virtual interaction queuing techniques over IP networks are disclosed. The method includes queuing the call in a queue associated with a call center, obtaining a messaging preference of the caller, disconnecting the call, generating at least one IP-based message for the caller according to the caller's messaging preference, and transmitting the at least one IP-based message to the caller over an IP network, so as to begin a virtual interaction between the caller and the call center after the call is disconnected.

30 Claims, 4 Drawing Sheets

VIRTUAL INTERACTION QUEUING USING INTERNET PROTOCOLS

BACKGROUND OF THE INVENTION

1. Field of the Invention

The present invention relates to a method and system for processing calls using virtual interaction queuing over an IP (internet protocol) network.

2. Discussion of the Related Art

Conventionally, when a caller places a call to speak with an agent of a company or business, a call center or contact center queues the call. If the requested agent is not available, the call remains connected and the caller receives "comfort prompts." Comfort prompts may be voice (either recorded or synthesized) messages regarding the unavailability of an agent, voice-recorded advertisements for the business, pre-recorded music, etc.

When the agent becomes available, then the queued call is passed to the agent and the caller can speak with the agent. A problem with this type of conventional call waiting process is that the caller is charged with toll costs since the call remains connected while the caller holds for the agent and receives the comfort prompts. If 800 numbers are used, then the call center has to absorb such tolling costs. As a result, this type of call waiting process places undue financial burden on call parties. Further, it can be extremely inconvenient and frustrating for callers to wait for a call pickup or to listen to comfort prompts repeatedly.

A method has been proposed which overcomes at least some of the problems discussed above. FIG. 1 is a diagram depicting this method according to a related art. As shown in FIG. 1, when a caller places a call for an agent of a company in step S2, the contact/call center queues the call in a queue according to the order of receipt, or other information associated with the call such as the dialed number or calling line ID, in step S4. When the agent is not available to pick up the call, this call is then cleared (i.e., disconnected) in step S6.

Thereafter, when the agent becomes available to pick up the call in step S8, the contact center places a callback to the caller so that a call contact between the agent and the caller can be made once again in step S10. This process is known as virtual queuing. A more detailed discussion of the virtual queuing process of a call can be found in U.S. Pat. No. 6,259,786 issued on Jul. 10, 2001.

In the conventional virtual queuing process as discussed above, since the call is disconnected once the call has been queued for a callback, the problem of incurring toll charges during a call wait is eliminated. Further, since a callback is automatically made to the caller once the agent becomes available, the caller is not inconvenienced by having to hold for the agent and the caller's time is not wasted by being on hold.

Although effective, there are still problems associated with the conventional virtual queuing process. One of the main problems is that contact between the caller and the contact center is completely lost once the call is disconnected until the callback is made. This can result in a loss of valuable customers and business. Furthermore, even if the callback is made, there is no guarantee that the caller will be able to answer the callback since the availability of the caller is not taken into account when the callback is made. In this case, resources can be wasted by placing callbacks to contact the caller. Moreover, callbacks often are made at times that are inappropriate for the caller since the conventional virtual queuing process does not take into account the caller's preferred callback time. This can annoy or inconvenience the caller.

Accordingly, an improved method and system is needed for processing calls which would overcome the above-described problems and limitations of conventional call processing and virtual queuing techniques.

SUMMARY OF THE INVENTION

The present invention provides a method and system for processing calls which overcome problems and limitations associated with the related art. Particularly, the present invention provides a method and system for processing a call when a call recipient is unavailable by using an IP (Internet Protocol)-based user-interactive approach. The method includes queuing the call in a queue associated with a call center, obtaining a messaging preference of the caller (the messaging preferences including caller presence and availability relating to the call), disconnecting the call, generating at least one IP-based message for the caller according to the caller's messaging preference, and transmitting the at least one IP-based message to the caller over an IP network, so as to begin a virtual interaction between the caller and the call center after the call is disconnected.

These and other objects of the present application will become more readily apparent from the detailed description given hereinafter. However, it should be understood that the detailed description and specific examples, while indicating preferred embodiments of the invention, are given by way of illustration only, since various changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

In the present invention, the term "agent" is used to refer to a recipient of a call placed by a caller. An agent can be a person or automatic interaction processing system (such as IVR) employed by a business, company, organization, or other entity, but is not limited to such.

Figure 1:
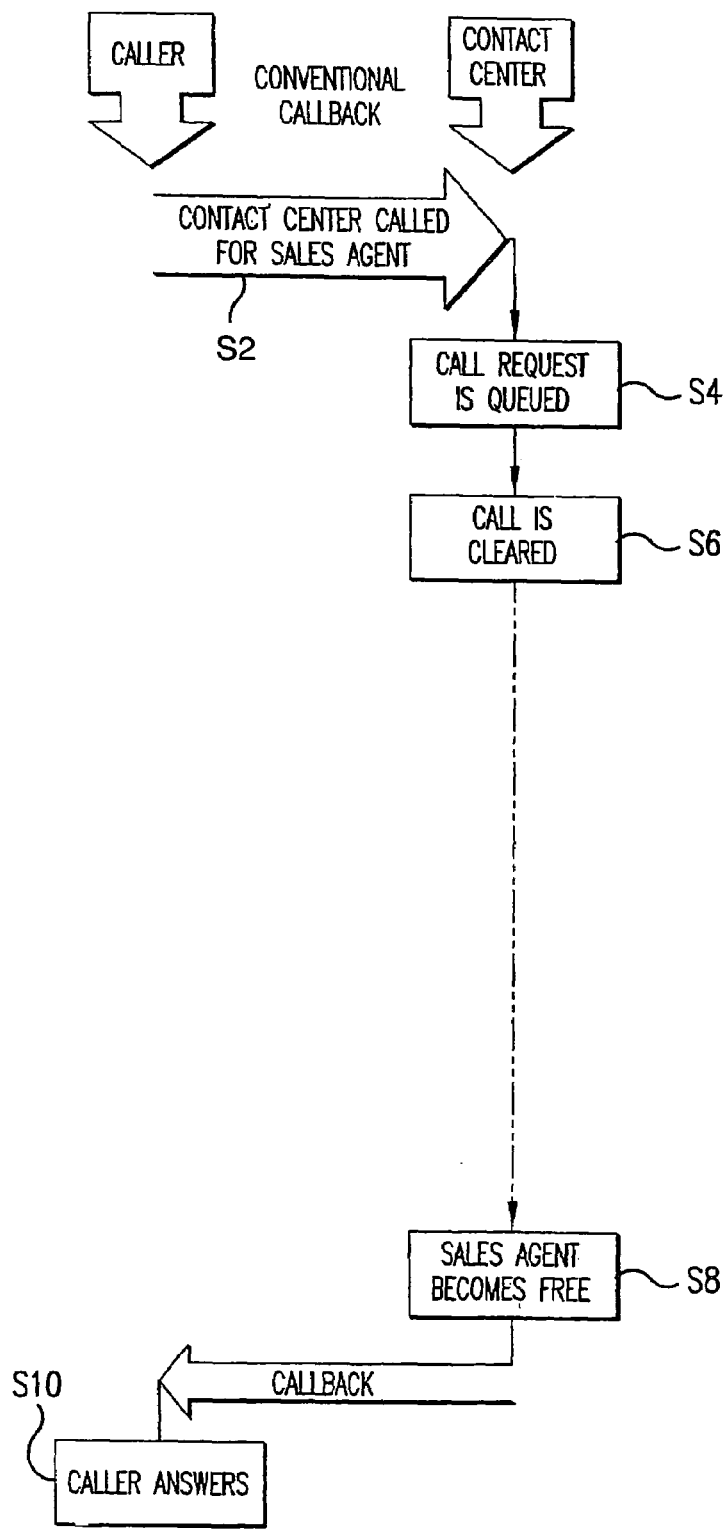
FIG. 1 is a diagram depicting a virtual queuing process for processing calls according to a related art.
Figure 2:
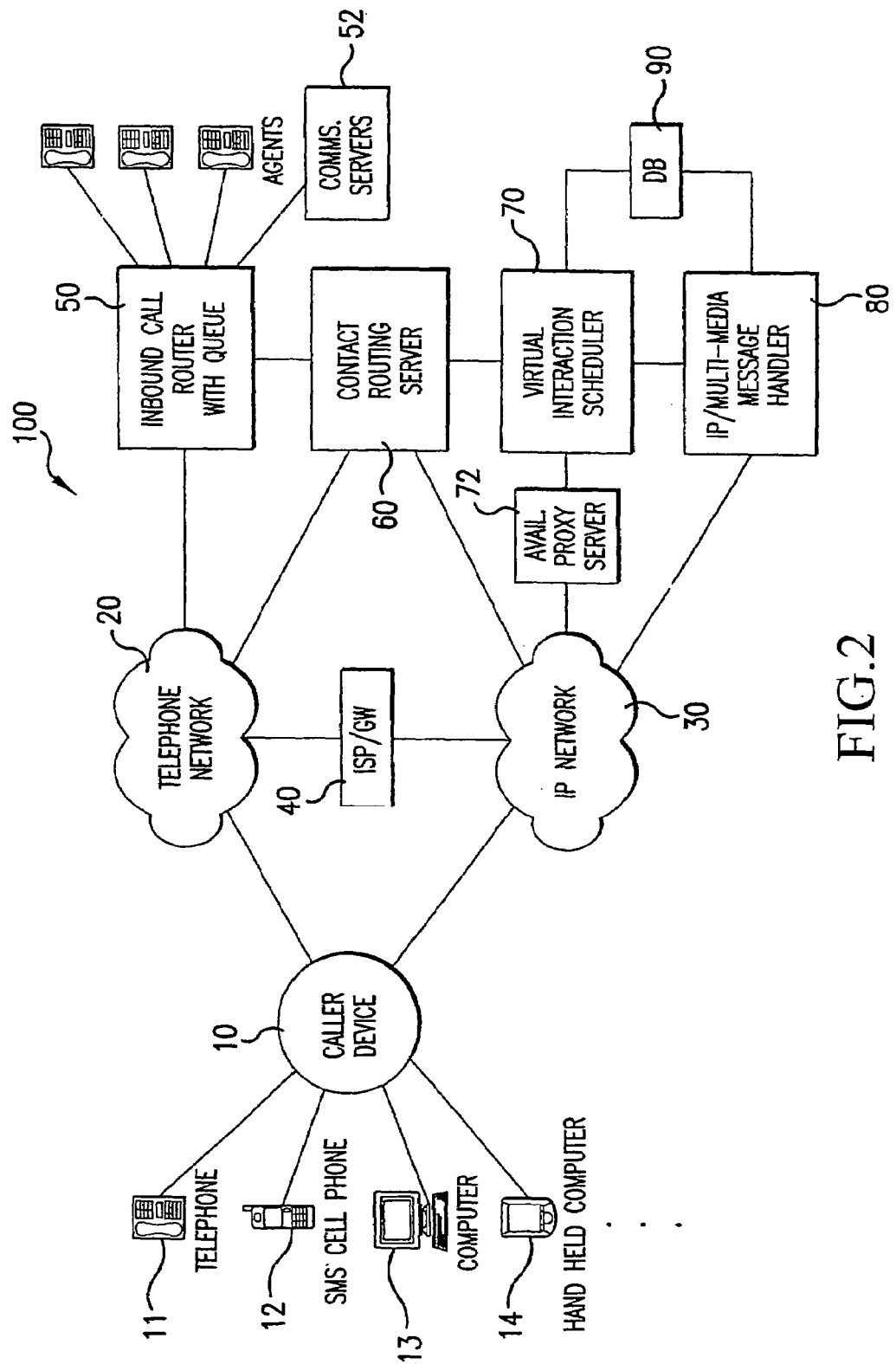
FIG. 2 is a block diagram of a system for processing calls according to an embodiment of the present invention.

FIG. 2 is a diagram of a system 100 for processing calls according to an embodiment of the present invention. As shown in FIG. 2, the system 100 includes a caller device 10 that a caller uses to place a call, a telephone network 20 which is any known public (PSTN) or private telephone network, an IP network 30 such as the Internet, intranet, extranet or other IP-based communications network, a gateway or ISP (Internet Service Provider) 40 used as an interface between the IP network 30 and the telephone network 20, an inbound call router 50 with a queue for routing incoming calls to appropriate agents or queuing the calls when the agents are not available, a contact routing server 60 for handling outbound calls, a virtual interaction scheduler 70, an availability proxy or server 72, an IP/Multi-Media message handler 80, and one or more databases 90 or other storage unit for storing information and data generated and used in the system 100. All the components of the system 100 are all operatively coupled.

In addition, the system 100 may include communication servers such as Interactive Voice Response (IVR) servers for providing voice-generated messages to callers as known in the art. The system 100 may additionally include any components typically present in existing telephone network systems to process calls, such a call scheduler, a switching device, etc.

In one embodiment, the components 50, 52, 60, 70, 80 and 90 may all reside at a call center for processing incoming calls. In another embodiment, these components may be located at separate places as needed.

The caller device 10 can be any known device or combination of devices having the capability of receiving and transmitting IP messages. Examples of the caller device 10 include, but are not limited to, an IP-based telephone 11, a mobile phone 12 (e.g., an SMS text message displayed on a cell phone), a computer 13 in the form of a laptop, workstation, or others, and a handheld computer 14 such as a Personal Digital Assistant (PDA). Depending on the type of the caller device 10 used to place a call, the telephone network 20 may receive a call request through the IP network 30 and the gateway/ISP 40. In this manner, although it is not shown, it is understood that the telephone network 20 can receive a call request from a caller device 10 through any known means such as via a satellite and/or base station. Although it is preferred that the caller device 10 be equipped with multi-media capabilities, such capabilities are not required to use the present invention.

The inbound call router 50 queues the incoming calls in the queue according to known techniques. Then the contact routing server 60 obtains a current caller's messaging preferences using techniques which will be discussed later, and disconnects the call once the call has been queued. The virtual interaction scheduler 70 schedules IP-based messages specific for the current user based on the caller's messaging preferences and capabilities. This information along with the derived contact schedule based on this information may be stored in the database 90.

Once the call has been disconnected, the IP/multi-media message handler 80 generates the IP-based messages for the caller and transmits them to a caller device 10 that may or may not be the same device that placed the original call over the IP network according to the schedule and the user's messaging preferences. The IP/Multi-Media message handler 80 also receives the caller's preferences for contact, availability and/or the caller's presence information from the caller device 10 over the IP network 30. Presence information is information identifying the availability of a caller based on the propensity to answer and/or the media capabilities of the caller. The availability proxy/server 72 obtains presence and availability information associated with the caller using the IP network 30, provides it to the IP/Multi-Media message handler and/or any other component requesting this information, and is known in the art. The generation and transmission of IP-based messages can vary depending on the caller's responses and presence information, as well as agent availability. The IP/Multi-Media message handler 80 oversees the interaction between the caller and the call center over the IP network 30.

When the system 100 is ready to place a callback to the caller (e.g., callback conditions have been satisfied), then the virtual interaction scheduler 70 requests the contact routing server 60 to place the callback using known callback dialing techniques. One such callback dialing technique is discussed in detail in the above-described U.S. Pat. No. 6,259,786 issued on Jul. 10, 2001, the entire content of which is herein fully incorporated by reference.

Figure 3:
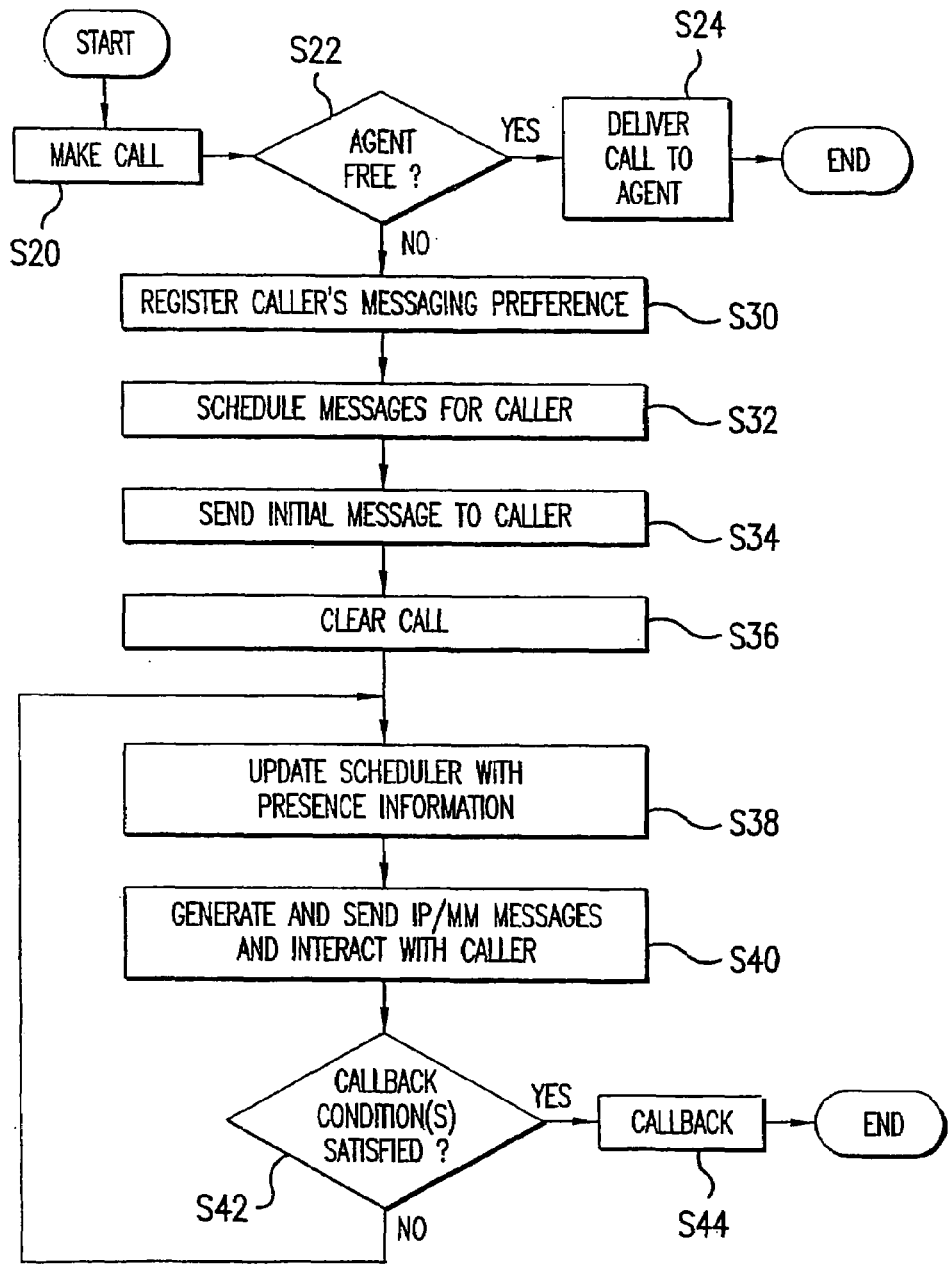
FIG. 3 is a flowchart illustrating processing steps of a method of processing calls according to an embodiment of the present invention.

FIG. 3 illustrates a flowchart illustrating processing steps of a method of processing calls according to an embodiment of the present invention. These processing steps can be implemented in the system 100 of FIG. 2 or other similar system.

Referring to FIGS. 2 and 3, in the method of the present invention, a call is placed by a caller to an agent using the caller device 10 in Step S20. This call request is received by the telephone network 20 and processed by the inbound call router 50. If the inbound call router 50 or like determines at Step S22 that the agent (or any other agent) is currently available to pick up the call, then the call is delivered to that agent in Step S24 and the process ends.

However, if it is determined at Step S22 that the agent is not available, then in Step S30 the current caller's messaging preferences are registered. The caller's messaging preferences indicate the manner in which the caller desires to receive the callback and/or IP-based messages before the callback. For instance, one caller may prefer to receive the callback after 9 p.m. when he or she is at home. Another caller may prefer to receive the IP-based messages in every 30 minutes only for 3 hours until the callback is made. The messaging preferences may also indicate the technical capability of the caller device 10 which can be used to determine what kind of messages should be sent to each caller, availability of the caller, a media capability of the caller, a purpose of the call, and/or the priority of using an agent's presence or availability information to override the user's preferences of a callback in the case when an agent becomes available before the allotted or desired callback time.

Step S30 can be implemented in a variety of different ways. For instance, the registration of the current user's messaging preferences can occur using IVR, VoIP (voice over IP), web browser, e-mail communication, etc. As an example, the contact routing server 60 can send a message requesting input of the caller's messaging preferences by displaying a web form (with the message) on the display device associated with the caller device 10 or by sending an e-mail requesting a return e-mail with the caller's messaging preferences through the IP network 30. In some cases, the caller's messaging preferences can be automatically supplied by the caller device 10 depending on the caller device 10. For instance, if the caller device 10 supports known IP messaging protocols such as Session Initiation Protocol (SIP), then SIP would automatically provide the technical capability information of the caller device 10. SIP is a known standards-based protocol for initiating communication over the Internet. Certain known programs such as Microsoft Windows Messenger, 3rd generation Cell Phones, and AOL Instant Messenger support SIP and related messaging protocols such as SIMPLE (SIP for Instant Messaging and Presence Leverage). In addition to or as an alternative to the above preference registration method, the caller may have previous contact and preferences information is maintained in a context repository (e.g. cookie associated with the callers web browser or some other repository on the caller device). The caller may then be asked to verify and/or update the existing preferences. For example, the caller may prefer to be contacted by SMS text message if this would be quicker than waiting for a voice call.

Once the caller's messaging preferences are registered at Step S30, the virtual interaction scheduler 70 in Step S32 schedules messages for the current caller based on the caller's messaging preferences and any other information. The scheduling may also be affected by predetermined criteria and/or policies. These messages would mainly be IP-based messages for transmission over the IP network 30, and can be selected to target specific needs, preferences, habits, etc. of the current caller. This information may be obtained through a combination of explicit caller request such as a web form request, and/or implicit information obtained through browsing history such as browser cookies (cookies are a known web technique for storing pieces of information relating to the interactions between web client and servers).

Further, these messages can be in any form or shape such as an e-mail, a pushed web page, an instant message, a VoIP message, an SMS message, a pop-up window, etc., and may include, but are not limited to, a message notifying the estimated time until the callback (which may pop up on the display device associated with the caller device 10), a web form providing a menu of options for the caller's selection (e.g., cancel call, need technical support, etc.), an e-mail or web page providing advertisements that may be caller-specific, etc. Any information which may be helpful to the current caller is provided to the caller in these IP-based messages with or without multi-media presentation, and such information including the caller's messaging preferences can be stored in the database 90.

Then in Step S34, the IP/Multi-Media message handler 80 sends an initial message to the current caller over the IP network 30. The initial message may inform the caller to hang up since the call will be cleared shortly. Then in Step S36, the current call is cleared (i.e., disconnected) using any known technique.

In Step S38, the virtual interaction scheduler 70 is updated with the caller's presence information. As discussed above, the presence information is information indicating the availability of the current caller to receive the callback and any IP-based messages. The technique of obtaining the presence information is known and is implemented by the availability proxy/server 72. For instance, in the existing instant messenger programs such as MS Windows Messenger or AOL Instant Messenger, the program is configured to automatically determine the availability of a user based on predetermined criteria. In one example, if the user's screen saver is on, then the program would automatically indicate to an outsider that the user is currently not available. The program is also configured so that the user can manually set his or her availability by using an input device such as a keyboard. In the present invention, the presence information can be obtained using such known techniques and configurations. The caller's presence information may change over a time period and thus, the scheduler 70 may need to be updated periodically as needed.

In Step S40, according to the current caller's presence information and the messaging preferences, the IP/Multi-Media message handler 80 generates and transmits various messages to the caller device 10 and interacts with the caller back and forth over the IP network 30. During this interaction, the call center can obtain any needed information from the caller and at the same time, present advertisements, promotions and other information to the caller. As a result, the call center does not lose contact with the caller even after the call is cleared and this time can be an effective tool for promoting business and other interests.

During or after such interaction, in Step S42 it is determined whether the callback condition(s) has been satisfied. This determination can be made by the scheduler 70 based on the status of the availability of the agent (or any agent), the caller's availability, the caller's preferred callback time if designated, caller's preferred callback device, any current request from the caller for the callback, and/or any other information that would be helpful to determine the optimal time for a callback.

If it is determined at Step S42 that the callback condition has not been satisfied, then the process returns to Step S38 and subsequent steps discussed above. On the other hand, if the callback condition has been satisfied, then the callback is made using existing techniques in Step S44. At Step S44, the caller's designated preference of using availability is determined. If the caller has indicated to call-back on the available (present) device, availability is determined of the caller through availability mechanisms (such as a presence proxy or server), and the call-back commences to the caller on the available device. Also, in one embodiment, it is determined whether the caller's presence information takes a higher priority over the user's preferences (if any) of a later callback, so that the callback is made according to the presence information if the presence information has priority over the user's preference of receiving a callback later. Then, the process ends.

It should be noted that the process of queuing the calls for callbacks and providing interaction between the callers and call center over the IP network according to the present invention is termed herein by the inventor as "virtual interaction queuing".

Figure 4:
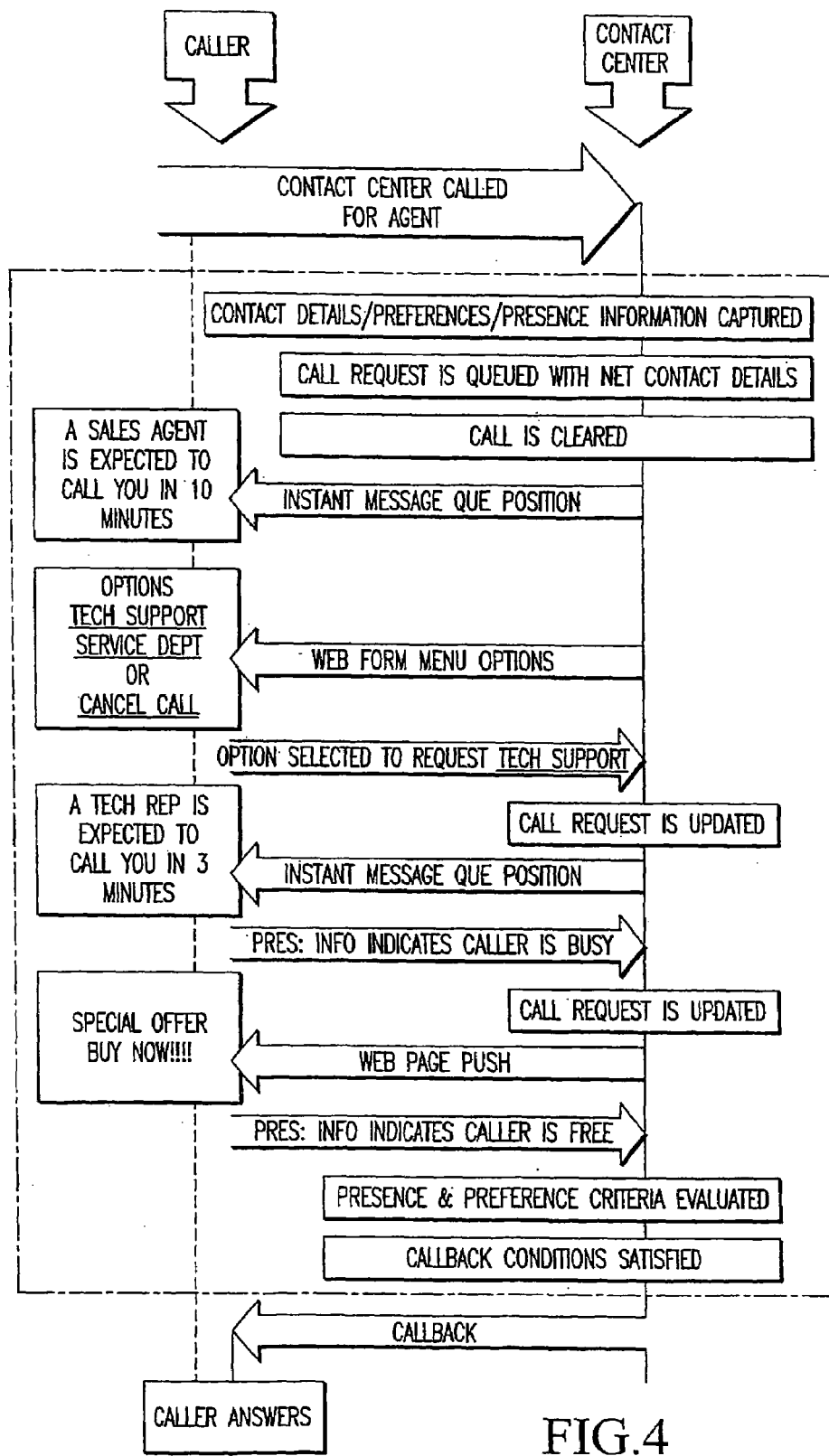
FIG. 4 is a flow diagram depicting one example of a virtual interaction queuing according to an embodiment of the present invention.

FIG. 4 is a flow diagram of an example of an interaction between a caller and a contact center according to an embodiment of the present invention. Briefly, as shown in FIG. 4, as the caller's call is queued, user preferences are registered, the call is cleared, various messages in different forms can be provided to the caller on the caller device 10 over the IP network 30, and the caller interacts with the contact center over the IP network 30 by receiving and transmitting IP-based messages until a callback is made successfully at the optimal time.

Accordingly, the present invention eliminates toll charges for both the caller and the call center and overcomes inconveniences associated with holding for an agent since the call request is cleared once it has been queued into the system. At the same time, the call center maintains close contact with the caller through IP-based messages and interactions until the callback is made. Moreover, the callback in the present invention is made allowing for the likely availability of both the agent and the caller, thereby increasing the efficiency and effectiveness of callbacks.

The present invention can be implemented by using existing hardware and/or software known in the art. Further, any known computer programming language or protocols can be used to implement the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of processing a call from a caller when a call recipient is unavailable, the method comprising:
   queuing the call in a queue associated with a call center;
   obtaining a messaging preference of the caller;
   disconnecting the call;
   generating at least one IP (internet protocol)-based message for the caller according to the callers messaging preference; and
   transmitting the at least one IP-based message to the caller over an IP network, so as to begin a virtual interaction between the caller and the call center after the call is disconnected and prior to a callback being placed,
   wherein the messaging preference of the caller is created by the caller independently from the call center.

2. The method of claim 1, further comprising:
   receiving presence Information of the caller over the IP network;
   generating at least one new IP-based message for the caller based on the received presence information; and
   transmitting the at least one new IP-based message to the caller over the IP network.

3. The method of claim 2, further comprising:
   determining whether a callback condition has been satisfied; and
   placing the callback when The callback condition has been satisfied.

4. The method of claim 3, wherein the determining step includes:
   determining an availability of the call recipient;
   determining an availability of the caller based on at least one of the caller's messaging preference and the callers presence information; and
   determining if the availability of the caller takes a higher priority over the caller's messaging preference of a later callback.

5. The method of claim 1, further comprising:
   receiving a response of the caller to the transmitted at least one IP-based message over the IP network during the vital interaction between the caller and the call center.

6. The method of claim 1, wherein the at least one IP-based message is in the form of at least one of the following: an e-mail, a web page, a pop-up window, a VoIP (Voice over IP) form, and an instant message form.

7. The method of claim 1, wherein the at least one IP-based message carries at least one of the following: advertisement, information on an availability of the call recipient, information on a status of a callback, and a menu of options for the caller's selection.

8. The method of claim 1, wherein the caller's messaging preference is obtained using at least one of the following: an e-mail, a web page. an IVR (interactive voice response), and SIP (Session Initiation Protocol).

9. The method of claim 1, wherein the messaging preference includes at least one of the following: an availability of the caller, a media capability of the caller, a purpose of the call, and priority information pertaining to presence/availability of the call recipient and the caller's preferences of a callback.

10. The method of claim 1, wherein a callback request from the caller is re-routed to another agent or target destination or is terminated based on information carried through at least one IP-based message.

11. A system for processing a call from a caller when a call recipient is unavailable, the system comprising:
    a call router queuing the call in a queue associated with a call center and then disconnecting the call; and
    an IP (internet protocol)-based message handler generating at least one IP-based message for the caller according to a messaging preference of the caller over an IP network, so as to begin a virtual interaction between the caller and the call center after the call is disconnected and prior to a callback being placed,
    wherein the messaging preference of the caller is created by the caller independently from the call center.

12. The system of claim 11, further comprising:
    a virtual interaction scheduler receiving presence information associated with the caller and scheduling IP-based messages to be sent to the caller based on the presence information and the messaging preference of the caller.

13. The system of claim 12, wherein the virtual interaction scheduler determines whether a callback condition has been satisfied and controls an operation of placing the callback when the callback condition has been satisfied.

14. The system of claim 13, wherein the scheduler determines whether a callback condition has been satisfied based on the following:
    an availability of the call recipient;
    an availability of the caller based on at least one of the caller's messaging preference and the caller's presence information; and
    whether the availability of the caller takes a higher priority over the caller's messaging preference of a later callback.

15. The system of claim 11, wherein the IP-based message handler receives responses from the caller to the IP-based messages over the IP network and processes the responses.

16. The system of claim 11, wherein the at least one IP-based message is in the form of at least one of the following: an e-mail, a web page, a pop-up window, a VoIP (Voice over IP) form, and an instant message form.

17. The system of claim 11, wherein the at least one IP-based message carries at least one of the following: advertisement, information on an availability of the call recipient, information on a status of a callback, and a menu of options for the caller's selection.

18. The system of claim 11, wherein the caller's messaging preference is obtained using at least one of the following: an e-mail, a web page, an IVR (interactive voice response), and SIP (Session Initiation Protocol).

19. The system of claim 11, wherein the messaging preference includes at least one at the following: an availability of the caller, a media capability of the caller, a purpose of the call, and priority information pertaining to presence/availability of the call recipient and the caller's preferences of a callback.

20. The system of claim 11, wherein the call router includes an outbound call muter for re-routing a callback request from the caller to another agent or target destination or for terminating the callback request based on information carried through at least one IP-based message.

21. A computer-readable medium encoded with computer-executable instructions for:
    queuing the call in a queue associated with a call center;
    obtaining a messaging preference of the caller;
    disconnecting the call;
    generating at least one IP (internet protocol)-based message for the caller according to the caller's messaging preference; and
    transmitting the at least one IP-based message to the caller over an IP network, so as to begin a virtual interaction between the caller and the call center after the call is disconnected and prior to a callback being placed, wherein the messaging preference of the caller is created by the caller independently from the call center.

22. The computer program product of claim 21, further comprising computer-executable instructions for:
receiving the caller's presence information over the IP network;
generating at least one new IP-based message tar the caller based on the received presence information; and
transmitting the at least one new IP-based message to the caller over the IP network.

23. The computer program product of claim 22, further comprising computer-executable instructions for:
determining whether a callback condition has been satisfied; and
placing the callback when the callback condition has been satisfied.

24. The computer program product of claim 23, wherein the computer-executable instructions for determining whether a callback condition has been satisfied make the determination based on the following:
an availability of the call recipient;
an availability of the caller based on at least one of the caller's messaging preference and the caller's presence information; and
whether the availability of the caller takes a higher priority over the caller's messaging preference of a later callback.

25. The computer program product of claim 21, further comprising computer-executable instructions for:
receiving a response of the caller to the transmitted at least one IP-based message over the IP network during the virtual interaction between the caller and the call center.

26. The computer program product of claim 21, wherein the at least one IP-based message is In the form of at least one of the following: an e-mail, a web page, a pop-up window, a VoIP (Voice over IP) form, and an instant message form.

27. The computer program product of claim 21, wherein the at least one IP-based message carries at least one of the following: advertisement, information on an availability of the call recipient, information on a status of a callback, and a menu of options for the caller's selection.

28. The computer program product of claim 21, wherein the caller's messaging preference is obtained using at least one of the following: an e-mail, a web page, an IVR (interactive voice response), and SIP (Session Initiation Protocol).

29. The computer program product of claim 21, wherein the messaging preference includes at least one of the following: an availability of the caller, a media capability of the caller, a purpose of the call, and priority information pertaining to presence/availability of the call recipient and the caller's preferences of a callback.

30. The computer program product of claim 21, further comprising computer-executable instructions for:
re-routing a callback request from the caller to another agent or a target destination or terminating the callback request based on information carried through at least one IP-based message.

* * * * *